United States Patent
Yao et al.

(10) Patent No.: US 6,822,497 B1
(45) Date of Patent: Nov. 23, 2004

(54) CLOCK GENERATOR

(75) Inventors: Jianguo Yao, Salem, NH (US); Matthew Courcy, Salem, NH (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/460,959

(22) Filed: Jun. 13, 2003

(51) Int. Cl.$^7$ ................................................ G06F 1/04
(52) U.S. Cl. ...................................... 327/291; 327/293
(58) Field of Search ............................ 327/291, 293, 327/294, 299, 116, 148, 157; 331/17, 25; 375/374, 375, 376

(56) References Cited

U.S. PATENT DOCUMENTS

| | | | | |
|---|---|---|---|---|
| 5,126,692 A | * | 6/1992 | Shearer et al. | 331/8 |
| 5,883,534 A | * | 3/1999 | Kondoh et al. | 327/156 |
| 6,573,798 B2 | * | 6/2003 | Uto | 331/16 |
| 6,642,756 B1 | * | 11/2003 | Yee et al. | 327/116 |

* cited by examiner

*Primary Examiner*—Linh M. Nguyen

(57) ABSTRACT

A system and method of generating a clock. A first clock is accessed. A delayed version of the first clock is created. A second clock signal is generated. A first edge of the second clock signal corresponds to a transition of the first clock signal, and a second edge of the second clock signal corresponds to a transition of the delayed version of the first clock signal.

14 Claims, 5 Drawing Sheets

1

CLOCK GENERATOR

TECHNICAL FIELD

Embodiments of the present invention relate to generating clock signals in electronic systems.

BACKGROUND ART

The duty cycle of an oscillating clock signal is generally understood to refer to or describe a ratio of the time that the signal is in a high state to the total period of the signal. Duty cycles are typically expressed as a percentage. Clock signals can be generated in a wide variety of well known ways, including, for example, crystal oscillators, resistor-capacitor (RC) oscillators, ceramic resonators and the like.

Much digital circuitry, for example, high performance digital circuitry, requires a very specific duty cycle from an input clock source. For example, many microprocessors and analog to digital converters require an input clock source with a duty cycle of 50 percent. Typically, the input duty cycle is required to be within a few percent, e.g., two percent, of this nominal value. Some circuits, for example semiconductor memory devices, require a duty cycle that is substantially not 50 percent.

It is frequently the case that a clock signal with an acceptable duty cycle is not available within a circuit design. Often, clock sources with required precision are undesirably expensive in terms of acquisition cost and/or area requirements if they are available. Consequently, it is frequently necessary to condition and/or adjust a clock signal in order to produce a new signal with desirable duty cycle characteristics.

Conventionally, a phase locked loop is used to generate a 50 percent duty cycle. Such phase locked loops generally have undesirable power consumption. Further, phase locked loops typically are relatively large circuits and require a high degree of skill to design. Additionally, phase locked loops have not been conventionally used to produce duty cycles of other than 50 percent.

Consequently, a clock generator capable of generating clock signals having desirable duty cycle characteristics at low power consumption and with relatively small area requirements is highly desirable.

DISCLOSURE OF THE INVENTION

A system and method of generating a clock are disclosed. A first clock is accessed. A delayed version of the first clock is created. A second clock signal is generated. A first edge of the second clock signal corresponds to a transition of the first clock signal, and a second edge of the second clock signal corresponds to a transition of the delayed version of the first clock signal.

BEST MODE FOR CARRYING OUT THE INVENTION

In the following detailed description of the present invention, clock generator, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail so as not to unnecessarily obscure aspects of the present invention.

Clock Generator

Embodiments of the present invention are described in the context of integrated semiconductor circuits. However, it is appreciated that embodiments of the present invention may be utilized in other areas of electronic design.

Figure 1:
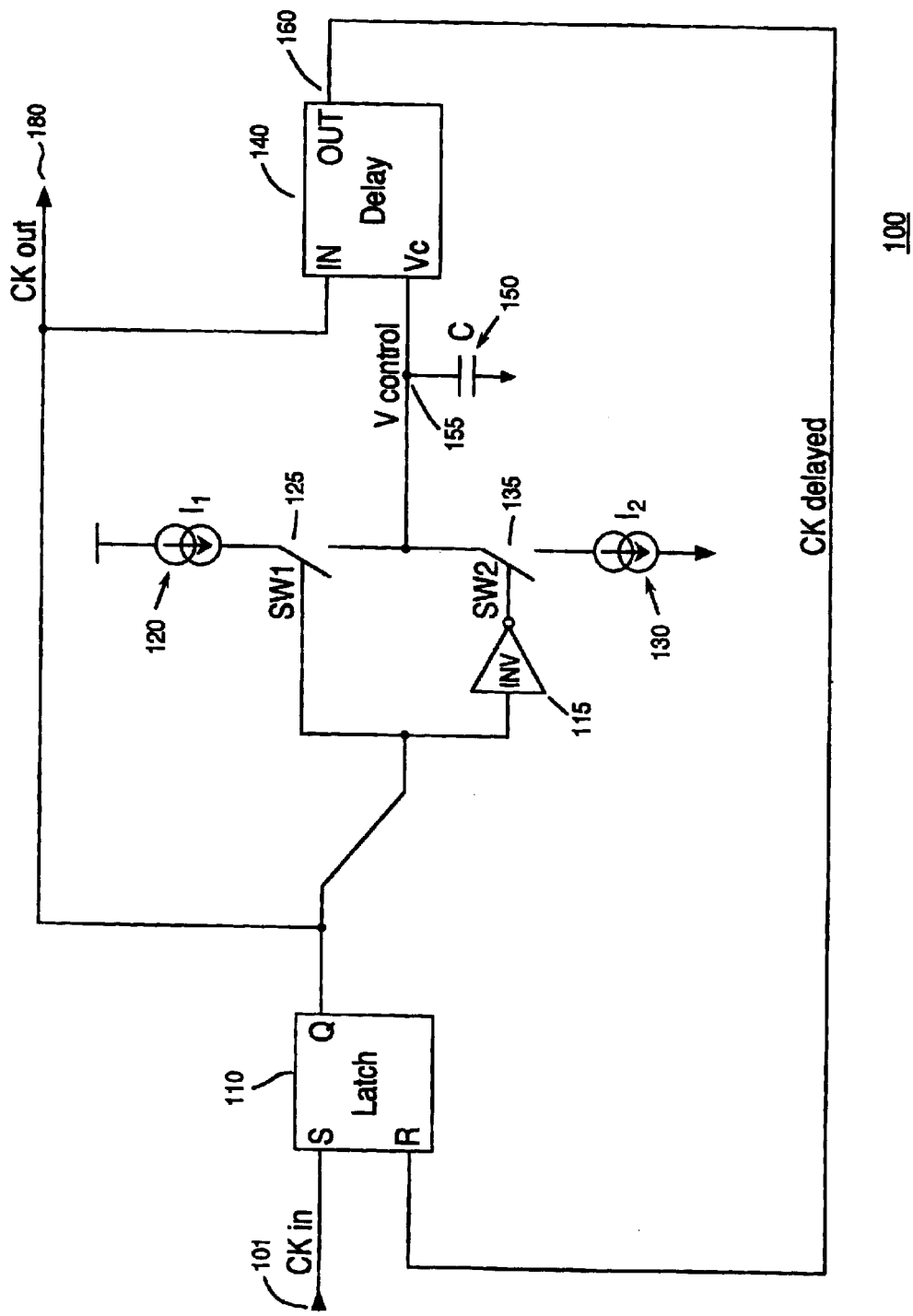
FIG. 1. illustrates a clock generator circuit, in accordance with embodiments of the present invention.

FIG. 1 illustrates a clock generator circuit 100, in accordance with embodiments of the present invention. An initial clock signal, CKin 101, is presented as input to clock generator circuit 100. Input clock signal CKin 101 may be generated by a variety of well known methods, including, for example, crystal oscillators, ring oscillators or resistor-capacitor (RC) oscillators. Typically, input clock signal CKin 101 will have an undesirable duty cycle characteristic. For example, input clock signal CKin 101 may typically be specified to have a duty cycle of between 40 percent and 60 percent. Generally, circuitry requiring a clock signal imposes a stricter duty cycle requirement upon such a clock signal. For example, many microprocessors require a clock signal with a duty cycle of 50 percent, with a few percent tolerance, e.g., plus or minus two percent. Non-symmetric duty cycle requirements are also well known.

The input clock signal CKin 101 input clock signal is coupled to the set ("S") node of latch 110. The output of latch 110, "Q," is an output clock signal CKout 180 with desirable duty cycle characteristics.

Output clock signal CKout 180 is further coupled to a control input of switch 1 125 and an input of inverter 115. The output of inverter 115 is coupled to a control input of switch 2 135. When output clock signal CKout 180 is high, switch 1 125 is closed, switch 2 135 is open, and current is sourced from current source 120. Such current charges charge storage device 150, e.g., a capacitor, creating a control voltage 155. When output clock signal CKout 180 is low, switch 1 125 is open, switch 2 135 is closed, and current is drawn from charge storage device 150 through current source 130. This operation decreases control voltage 155. It is to be appreciated that switch 1 125 and switch 2 135 operate in a complementary manner, e.g., one switch and only one switch is open at any time.

Control voltage 155 is coupled to voltage controlled delay circuitry 140. As will be described in greater detail below, voltage controlled delay circuitry 140 accepts output clock signal CKout. Output clock signal CKout is delayed as a function of control voltage 155. The output of voltage controlled delay circuitry 140 is a delayed version of CKout, clock signal CKdelayed 160. Clock signal CKdelayed 160 is coupled to the reset ("R") input of latch 110.

A rising edge of input clock signal CKin 101 triggers latch 110, creating a logic transition from low to high on the "Q" output of latch 110, and consequently on output clock signal CKout 180. A high state of output clock signal CKout 180 causes switch 1 125 to turn on, or close. Current source 120 begins to charge charge storage device 150, increasing control voltage 155. After a delay (related to control voltage 155), clock signal CKdelayed 160 similarly transitions from low to high.

A low to high transition on the reset ("R") input of latch 110, resets latch 110, driving output clock signal CKout 180 low. A low level of output clock signal CKout 180 opens, or turns off, switch 1 125, and closes, or turns on, switch 2 135. Current source 130 begins to discharge charge storage device 150, decreasing control voltage 155.

At substantially the same time, a falling edge of output clock signal CKout 180 propagates through voltage controlled delay circuitry 140, returning to the reset ("R") input of latch 110. Latch 110 is edge-triggered, e.g., it responds only to rising edges of signals (low to high transitions). Consequently, latch 110 does not change state until a subsequent rising edge of input clock signal CKin 101.

During each cycle of input clock signal CKin 101, charge on charge storage device 150 changes by:

$$\Delta Q1-Q2=I1\times T1-I2\times T2 \quad \text{(Relation 1)}$$

where Q1 is the charge added to charge storage device 150 for a first phase of clock signal CKout 180, and Q2 is the charge removed from charge storage device 150 for a subsequent phase of clock signal CKout 180. T1 and T2 are the charging times, which may be different.

If charge on charge storage device 150 increases for one cycle of input clock signal CKin 101, then control voltage 155 also increases. An increase in control voltage 155 causes the delay in voltage controlled delay circuitry 140 to decrease. Consequently, for the subsequent cycle of input clock signal CKin 101, T1 will decrease due to the increase in control voltage 155, and T2 increases.

If charge on charge storage device 150 decreases for one cycle of input clock signal CKin 101, then control voltage 155 also decreases. A decrease in control voltage 155 causes the delay in voltage controlled delay circuitry 140 to increase. Consequently, for the subsequent cycle of input clock signal CKin 101, T1 will increase due to the decrease in control voltage 155, and T2 decreases.

It is to be appreciated that the negative feedback described previously continues until an equilibrium state is achieved. At equilibrium, the charge on charge storage device 150 is stable, and ΔQ (Relation 1) is zero. Thus, from cycle to cycle, the average voltage across charge storage device 150 is constant, the delay has a constant value, and the loop is "locked."

The duty cycle of output clock signal CKout 180 is a function of the ratio of the two current sources, I1 and I2. More specifically, $$\text{Duty cycle}=I2/(I1+I2) \quad \text{(Relation 2)}$$

If the two current sources (120, 130 of FIG. 1) are of equal magnitude then output clock signal CKout 180 will have a 50 percent duty cycle. Output clock signal CKout 180 can be aligned with the rising edge of input clock signal CKin 101. Such a 50 percent duty cycle is commonly used in analog to digital converters and microprocessors.

Current sources 120 and 130 can be constructed so as to have different current magnitudes in accordance with embodiments of the present invention. For example, to produce a duty cycle of 30 percent, the ratio of I1 to I2 should be seven to three (7/3). Such ratios of current sources are well known. Current sources realized on a common integrated circuit substrate will typically show similar effects to variations in semiconductor process characteristics, operating temperature, supply voltage and the like. Consequently, a ratio of such current sources is typically very stable. Thus, a duty cycle of an output clock signal produced in accordance with embodiments of the present invention will generally be very stable with respect to such variations in manufacturing and operating environment.

Duty cycles of other than about 50 percent are widely used in memory integrated circuits. For example, pre-charge circuitry and sense amplifiers in such memory integrated circuits frequently require different time intervals to perform their operations. Duty cycles of other than about 50 percent are also desirable in mixed signal circuitry involving "Domino" logic in which one phase is typically used to settle the Domino chain, and another, typically shorter, phase is used to latch data.

It is to be appreciated that embodiments in accordance with the present invention are well suited to the use of variable current sources for current sources 120 and/or 130 (FIG. 1). The use of variable current sources can enable producing clock signals with adjustable duty cycles, corresponding to the permutations of current ratios available. Further, the duty cycle of an output clock signal can be varied over time if so desired.

Figure 2:
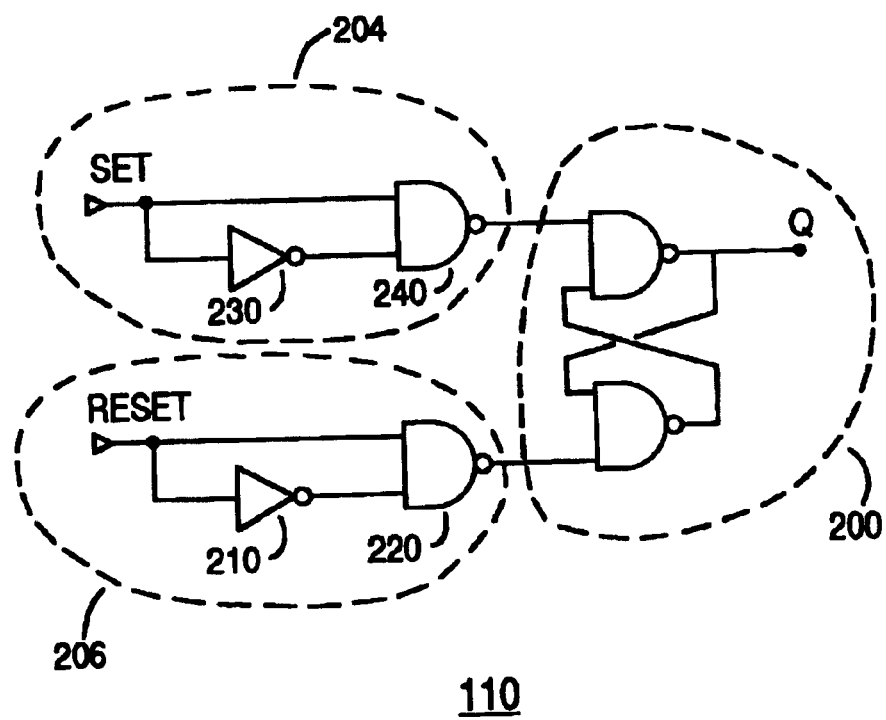
FIG. 2 illustrates a latch circuit, in accordance with embodiments of the present invention.

FIG. 2 illustrates a latch 110 circuit, in accordance with embodiments of the present invention. Latch 110 comprises a well-known set-reset, or "SR," flip flop circuit 200. Edge triggering circuit 204 is coupled to the set input of SR flip flop circuit 200. It is to be appreciated that other latch circuits are well suited to embodiments in accordance with the present invention.

Edge triggering circuit 204 comprises NAND gate 240 and inverter 230. One input of NAND gate 240 is the set input of latch 110, which can be, for example, input clock signal CKin 101 of FIG. 1. The other input of NAND gate 240 is an inverted and delayed version of the signal at the set input of latch 110 via the output of inverter 230. A rising edge at the set input of latch 110 causes a high level at the first (top) input of NAND gate 240. The second (bottom) input of NAND gate 240 is initially a high level due to the propagation delay through inverter 230. Thus, both inputs to NAND gate 240 are high, and the output of NAND gate 240 is low. After a propagation delay period of inverter 230, the second (bottom) input of NAND gate 240 goes low, and the output of NAND gate 240 consequently goes high.

Edge triggering circuit 206, comprising inverter 210 and NAND gate 220, operates in a similar fashion for the reset signal to latch 110. The reset signal to latch 110 can be, for example, the clock signal CKdelayed 160 of clock generator circuit 100 as described previously in FIG. 1.

Figure 3:
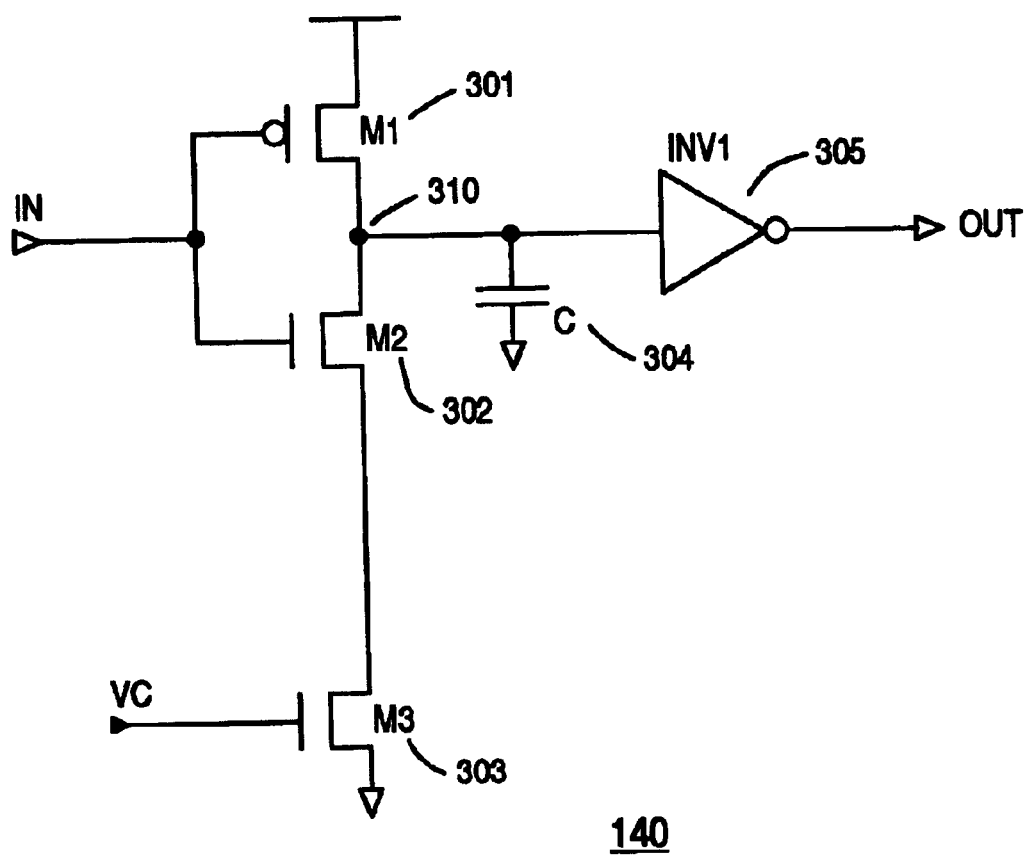
FIG. 3 illustrates a voltage controlled delay circuitry, in accordance with embodiments of the present invention.

FIG. 3 illustrates a voltage controlled delay circuitry 140, in accordance with embodiments of the present invention. Voltage controlled delay circuit comprises three transistor devices, 301, 302 and 303, an inverter 305 and a charge storage device 304. A control voltage, for example control voltage 155 of FIG. 1, is accessed at the gate of transistor device 303. The control voltage establishes a reference current through transistor device 303.

A clock signal, for example, output clock signal CKout 180 of FIG. 1, is accessed at the gates of transistor devices 301 and 302. It is to be appreciated that transistor devices 301 and 302 form an inverter structure. If the clock signal transitions from high to low, the output 310 transitions low to high relatively quickly. If the clock signal transitions from low to high, the output 310 transitions high to low relatively slowly due to a current limiting effect of transistor device 303. Inverter 305 serves to sharpen the edges of transitions of output 310. The output of inverter 305 is a delayed version of the clock signal.

Under some circumstances, clock generator circuit 100 can achieve an undesirable "false lock" condition at a harmonic, or sub-harmonic frequency of the input clock frequency, e.g., input clock signal CKin 101. A "false lock" condition can occur, for example, when a rising edge of the delayed clock signal arrives at the reset ("R") input of latch 110 substantially at the same time as a rising edge of input clock signal CKin 101 arrives at the set ("S") input of latch 110. This situation can occur, for example, with a delay corresponding to an integral number of input clock signal CKin 101 clock periods. If the reset signal of latch 110 "wins" the race condition, then the loop can lock to a multiple of the input clock signal CKin 101 period.

Figure 4:
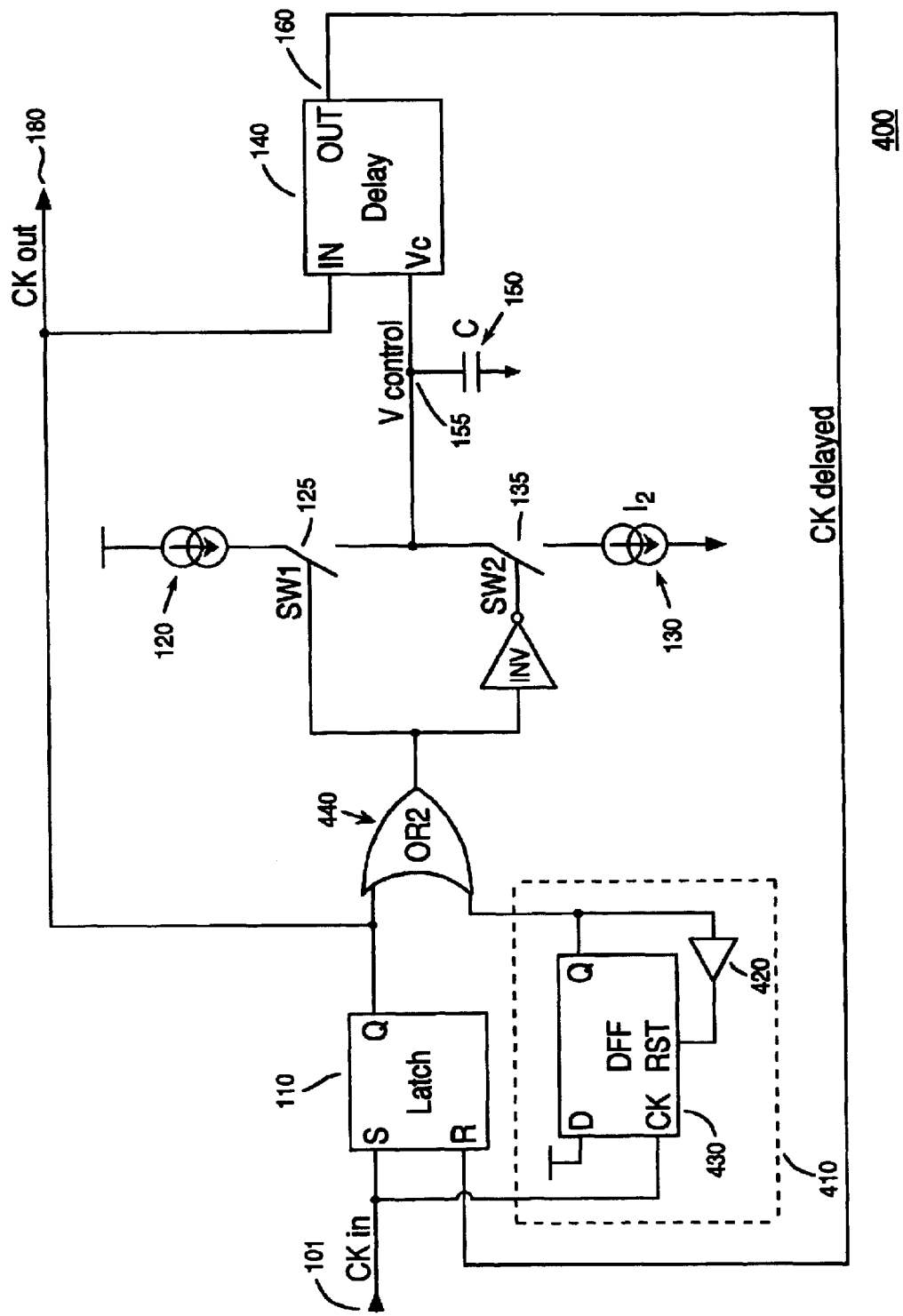
FIG. 4 illustrates a clock generator circuit, in accordance with embodiments of the present invention.

FIG. 4 illustrates a clock generator circuit 400, in accordance with embodiments of the present invention. In addition to the previously described elements of the same identifying numbering, clock generator circuit 400 comprises anti-false lock circuitry 410 and OR gate 440.

Switches 1 125 and 2 135 of clock generator circuit 400 are controlled by the output of OR gate 440. A first input of OR gate 440 is output clock signal CKout 180. A second input of OR gate 440 is the output of D-type flip flop 430. Anti-false lock circuitry 410 generates a pulse of short duration. The rising edge of this pulse is substantially aligned with a rising edge of input clock signal CKin 101.

For normal operation of clock generator circuit 400, the short pulses of anti-false lock circuitry 410 are dominated by the longer clock pulses of output clock signal CKout 180. Consequently, the output of OR gate 440 substantially reflects output clock signal CKout 180. However, when a condition of false lock occurs, some pulses of anti-false lock circuitry 410, e.g., every other such pulse, will not occur simultaneously with output clock signal CKout 180. Consequently, the second input to OR gate 440 will occasionally be high outside of the high state of output clock signal CKout 180. Advantageously, this process will adjust the charge on charge storage device 150, for example by adding current through switch 1 125, which changes control voltage 155 and ultimately changes the delay through voltage controlled delay circuitry 140. As a beneficial consequence, clock generator circuit 400 will be driven out of a false lock condition.

Figure 5:
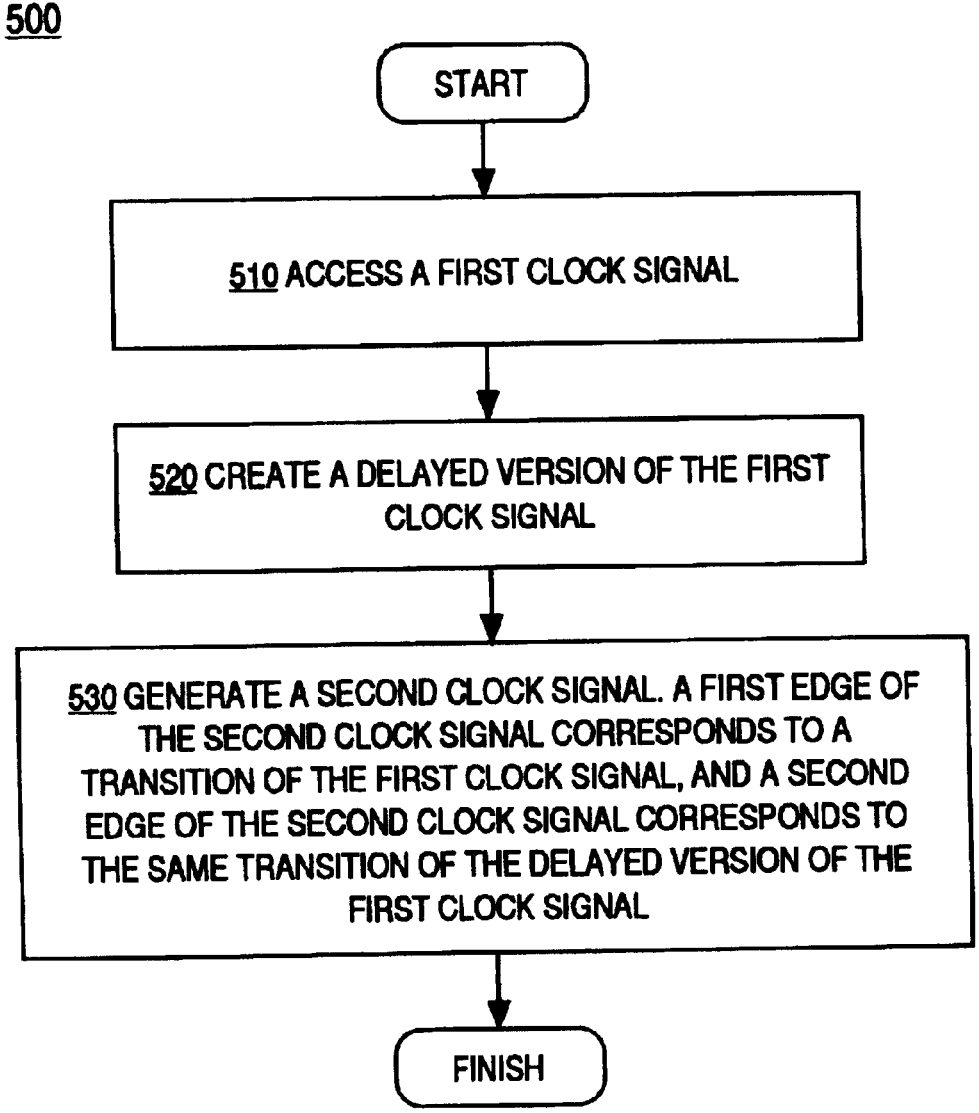
FIG. 5 illustrates a flow chart of a method for generating a clock, in accordance with embodiments of the present invention.

FIG. 5 illustrates a flow chart of a method 500 for generating a clock, in accordance with embodiments of the present invention. In step 510, a first clock signal is accessed. Such a clock signal can be generated in a variety of well known ways, including, e.g., a crystal oscillator or a ring oscillator. The first clock signal can typically have an undesirable duty cycle, or an undesirable specification of duty cycle.

In step 520, a delayed version of the first clock signal is created. Such a delayed version of the first clock signal can be created, for example, via voltage controlled delay circuit 140 of FIG. 1. In Step 530, a second clock signal is generated. A first edge of the second clock signal corresponds to a transition of the first clock signal, and a second edge of the second clock signal corresponds to the same transition of the delayed version of the first clock signal.

Embodiments in accordance with the present invention are typically faster to lock than conventional phase locked loop designs of equivalent power. In addition, such embodiments generally produce a very "clean" clock, with less jitter than conventional designs. Such clean clock signals are of benefit when used as a sample edge for an analog to digital converter.

Embodiments in accordance with the present invention, clock generator, are thus described. While the present invention has been described in particular embodiments, it should be appreciated that the present invention should not be construed as limited by such embodiments, but rather construed according to the below claims.

What is claimed is:

1. A clock generator circuit comprising:
   a charge storage device;
   first and second current sources for charging and discharging said charge storage device;
   two switches for selectively coupling one of said first and second current sources to said charge storage device;
   a voltage controlled delay circuit for delaying a clock signal according to a voltage on said charge storage device;
   a latch circuit for receiving an input clock signal and producing an output clock signal; and
   said latch circuit also for resetting said output clock signal responsive to a delayed clock signal produced by said voltage controlled delay circuit.

2. The clock generator circuit of claim 1 wherein said output clock signal controls said two switches.

3. The clock generator circuit of claim 1 wherein said charge storage device is a capacitive element.

4. The clock generator circuit of claim 1 embodied in an integrated circuit.

5. The clock generator circuit of claim 4 wherein said integrated circuit comprises an analog to digital converter.

6. The clock generator circuit of claim 4 wherein said integrated circuit comprises a microprocessor.

7. The clock generator circuit of claim 1 wherein at least one of said first and second current sources is a variable current source.

8. A clock generator circuit comprising:
   a charge storage device;
   first and second current sources for charging and discharging said charge storage device;
   two switches for selectively coupling one of said first and second current sources to said charge storage device;
   a voltage controlled delay circuit for delaying a clock signal according to a voltage on said charge storage device;
   a latch circuit for receiving an input clock signal and producing an output clock signal;
   said latch circuit also for resetting said output clock signal responsive to a delayed clock signal produced by said voltage controlled delay circuit; and
   an anti-false locking circuit operable to control said two switches to adjust charge on said charge storage device.

9. The clock generator circuit of claim 8 wherein said anti-false locking circuit adjusts said charge on said charge storage device responsive to a condition of false lock.

10. The clock generator circuit of claim 8 wherein said charge storage device is a capacitive element.

11. The clock generator circuit of claim 8 embodied in an integrated circuit.

12. The clock generator circuit of claim 11 wherein said integrated circuit comprises an analog to digital converter.

13. The clock generator circuit of claim 11 wherein said integrated circuit comprises a microprocessor.

14. The clock generator circuit of claim 8 wherein at least one of said first and second current sources is a variable current source.

* * * * *